United States Patent
Qiu et al.

(12)

(10) Patent No.: US 10,161,582 B1
(45) Date of Patent: Dec. 25, 2018

(54) SOLAR-POWERED COLLAPSIBLE LANTERN

(71) Applicant: Evergreen Enterprises of Virginia, LLC, Richmond, VA (US)

(72) Inventors: Fei Qiu, Richmond, VA (US); Lin hui Sun, Ningbo (CN); Lynda Scott Musante, Midlothian, VA (US)

( * ) Notice: Subject to any disclaimer, the term of this patent is extended or adjusted under 35 U.S.C. 154(b) by 0 days.

(21) Appl. No.: 15/665,112

(22) Filed: Jul. 31, 2017

(51) Int. Cl.
| | |
|---|---|
| *F21S 9/03* | (2006.01) |
| *F21V 1/06* | (2006.01) |
| *F21V 3/02* | (2006.01) |
| *F21V 23/04* | (2006.01) |
| *F21V 7/00* | (2006.01) |

(52) U.S. Cl.
CPC ............... *F21S 9/037* (2013.01); *F21V 1/06* (2013.01); *F21V 3/023* (2013.01); *F21V 7/0075* (2013.01); *F21V 23/0442* (2013.01)

(58) Field of Classification Search
USPC ................................................. 362/157–208
See application file for complete search history.

(56) References Cited

U.S. PATENT DOCUMENTS

| | | | | |
|---|---|---|---|---|
| 2008/0000513 | A1* | 1/2008 | Yul | .......................... E04H 15/10 136/245 |
| 2017/0198873 | A1* | 7/2017 | Ashmore | ................ F21V 29/70 |

* cited by examiner

*Primary Examiner* — Matthew Mikels
(74) *Attorney, Agent, or Firm* — Jordan IP Law, LLC; Todd A. Vaughn (57) ABSTRACT

A solar-powered, collapsible lantern that employs a frame assembly of an umbrella and which is movable between a collapsed, storage position and an expanded, deployed position. The solar-powered lantern includes a plurality of light sources supported by the frame assembly for illumination of the lantern and the surrounding environment when the lantern is manipulated from a collapsed, storage position to an expanded, deployed position. The solar-powered lantern may include a removable hook to suspend the lantern from a suspension point. The hook may be interchanged with a removable stake that is insertable into a support surface, to support or otherwise anchor the lantern on the support surface. The power source may include at least one solar panel configured for selective movement to permit adjustable orientation of the at least one solar panel relative to the sun.

19 Claims, 12 Drawing Sheets

SOLAR-POWERED COLLAPSIBLE LANTERN

TECHNICAL FIELD

Embodiments relate to a lantern configured to emit light, and particularly, to a solar-powered, collapsible lantern that employs a frame assembly of an umbrella and which is movable between a collapsed, storage position and an expanded, deployed position. The solar-powered lantern includes a plurality of light sources supported by the frame assembly for illumination of the lantern and the surrounding environment when the lantern is manipulated from a collapsed, storage position to an expanded, deployed position. The solar-powered lantern may include a removable hook to suspend the lantern from a suspension point. The hook may be interchanged with a removable stake that is insertable into a support surface, to support or otherwise anchor the lantern on the support surface. The power source may include at least one solar panel configured for selective movement to permit adjustable orientation of the at least one solar panel relative to the sun.

BACKGROUND

Outdoor lanterns may be used to illuminate and decorate homes and yards, and may be hung for suspension by a hook or supported on the ground surface by a stake. Among such lanterns are solar-powered lanterns that may be collapsed for storage.

DRAWINGS

The summary of embodiments, as well as the detailed description is better understood when read in conjunction with the accompanying drawings that illustrate one or more possible embodiments of embodiments, in which.

DESCRIPTION

As illustrated in FIGS. 1 through 9, in accordance with embodiments, a decorative solar-powered lantern 10 shown in a collapsed, storage position. The lantern 10 comprises a frame assembly 20 and a light assembly 40 to emit light. The lantern 10 may be used for placement on an underlying support surface in a room of a home, or an open area of a lawn, patio, garden or the like. The lantern 10 may also be hung in room of a home, or an open area of a lawn, garden or the like.

Figure 3:
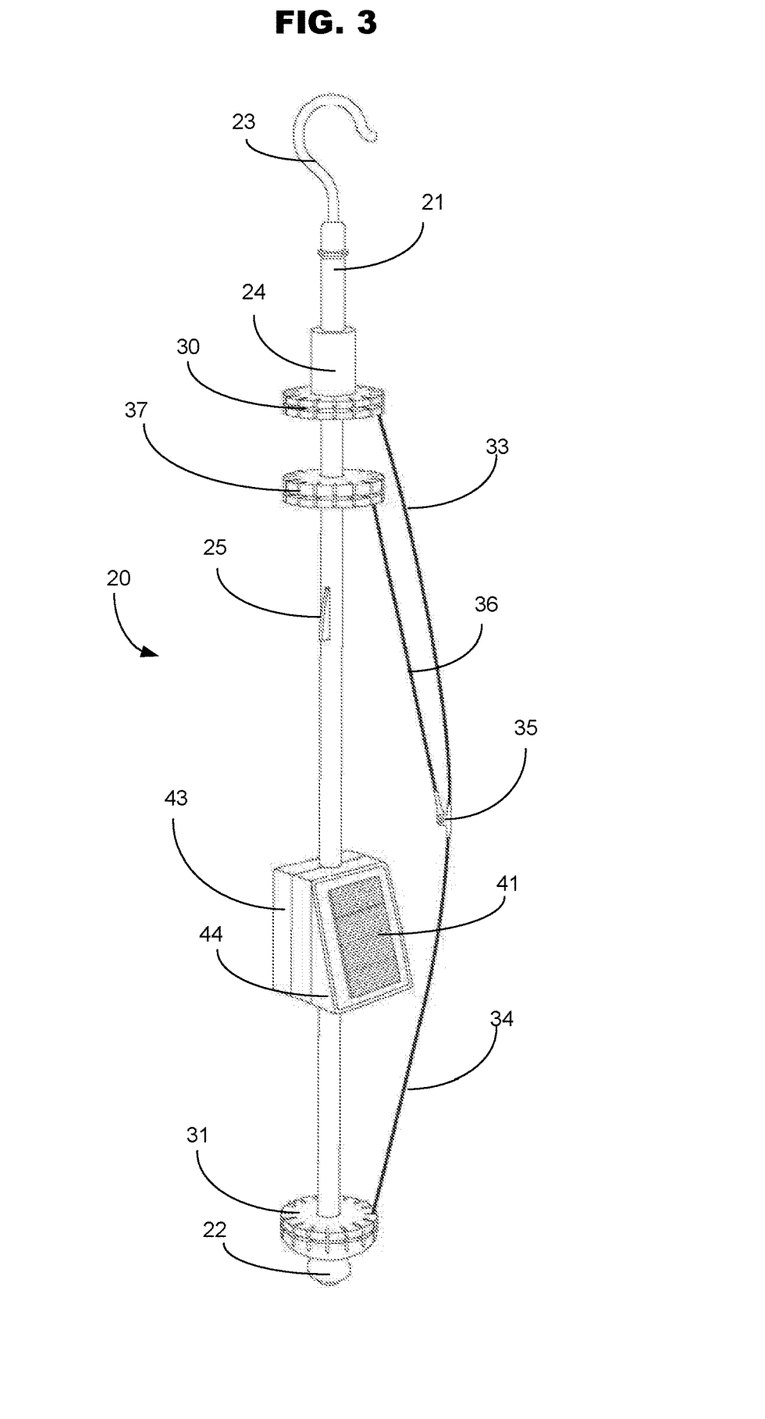
FIG. 3 is a side view of the frame assembly and rib assembly of the solar-powered lantern of FIG. 1.

As illustrated in FIG. 3, the frame assembly 20 comprises a structure that permits quick and efficient manipulation of the lantern 10 between a collapsed, storage position and an expanded, deployed position. In particular, the frame assembly 20 comprises a shaft 21 having a longitudinal axis, a ferrule 22 arranged at a first distal most end of the shaft 21 and a support device comprising a hook 23 which is removably attached to a second distal most end of the shaft 21 to permit suspension of the lantern 10 from a suspension point.

Figure 5A:
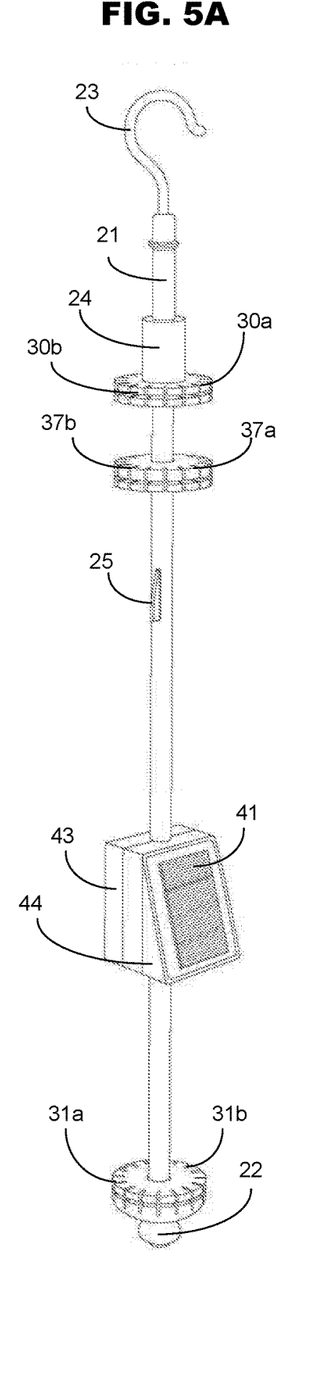
FIGS. 5A and 5B respectively illustrate a partial view of the runner and rib support of the solar-powered lantern of FIG. 1, with the locking sleeve in unlocked and locked positions.
Figure 5B:
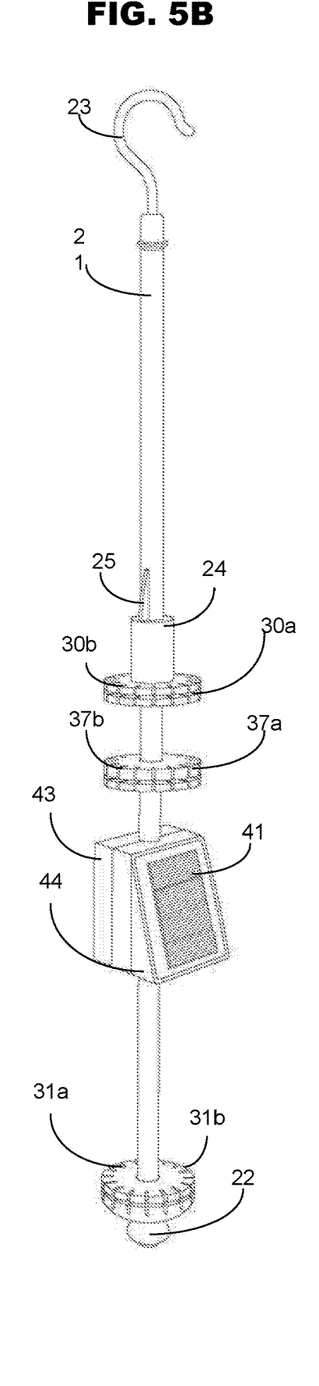

A locking sleeve 24 is arranged for selective movement along the longitudinal axis of the shaft 21 between an unlocked state (See, FIG. 5A) in which the lantern 10 is in a collapsed, storage position, and a locked state in which the lantern 10 is in an expanded, deployed position (See, FIG. 5B).

As illustrated in FIGS. 1 through 4, the lantern 10 further comprises a first rib support 30 arranged for selective movement along the longitudinal axis of the shaft 21, and a second rib support 31 fixedly arranged on a second end of the shaft 21 which is spaced apart from the first end. Although the first rib support base 30 is described and illustrated as being selectively moveable, embodiments are not limited thereto. For example, alternatively, an embodiment may provide that the first rib support 30 and the second rib support 31 are both fixedly arranged on the shaft 21.

Figure 1:
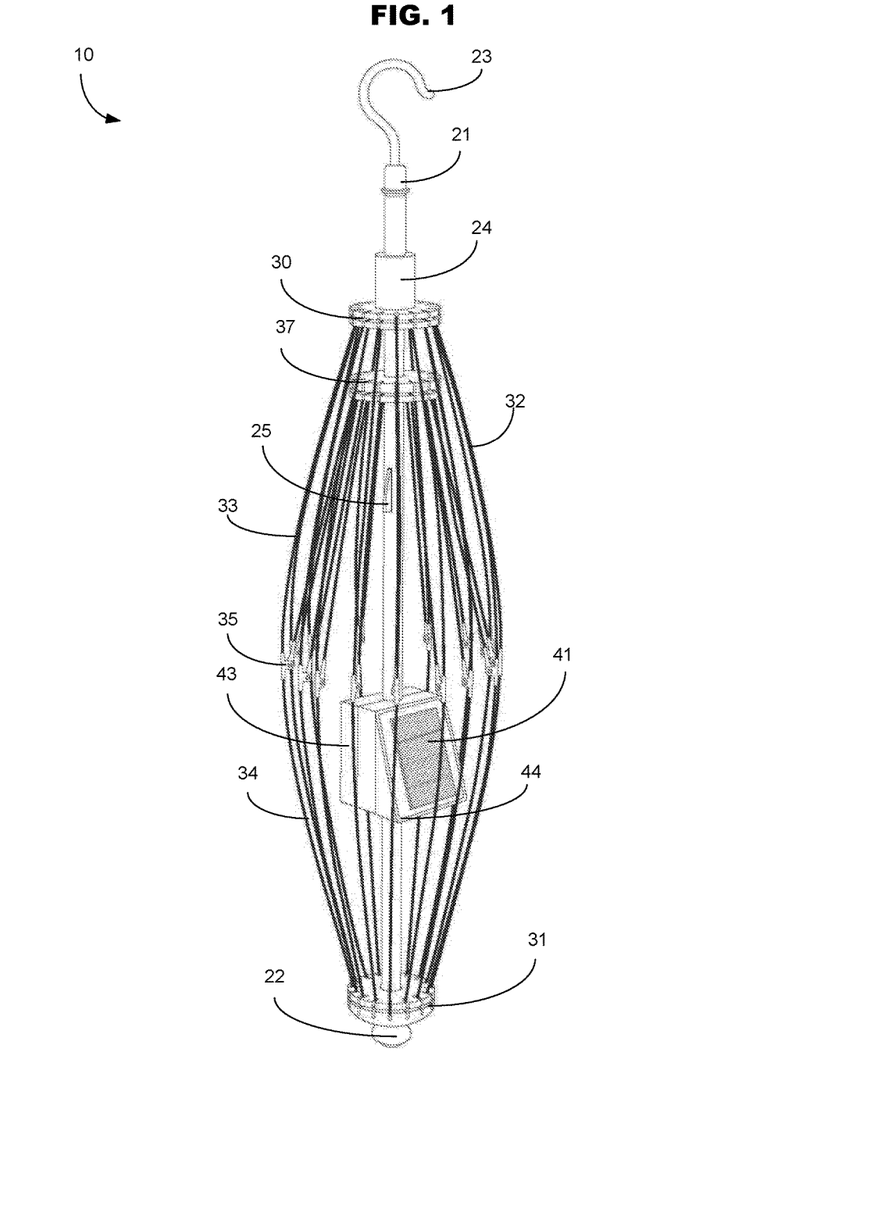
FIG. 1 is a side view of a solar-powered lantern in a collapsed, storage position, and having a removable hook for suspension thereof, in accordance with embodiments.
Figure 2:
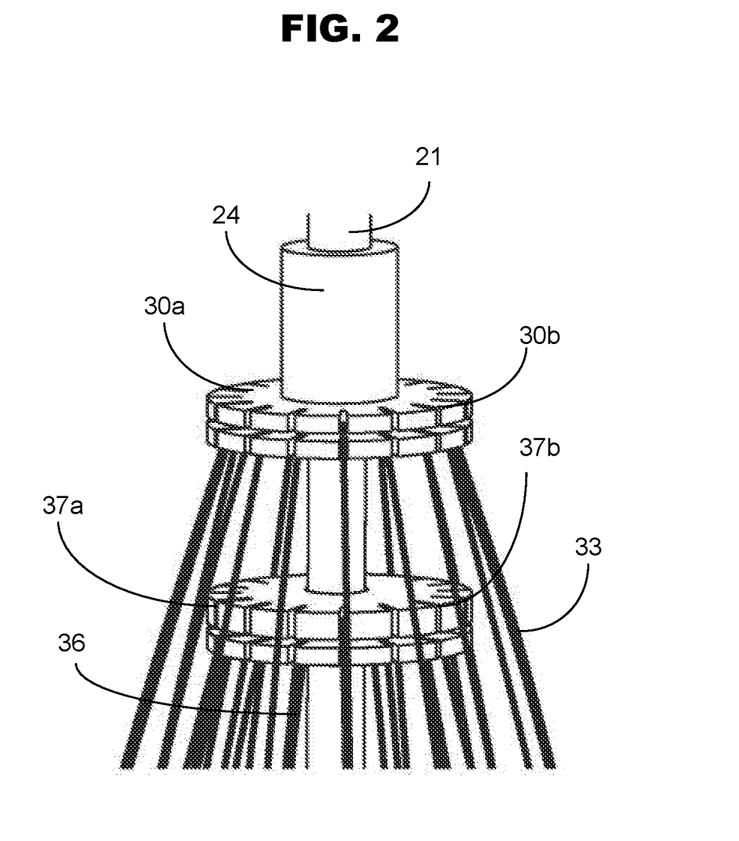
FIG. 2 is a partial view of the runner and rib support of the solar-powered lantern of FIG. 1.
Figure 4:
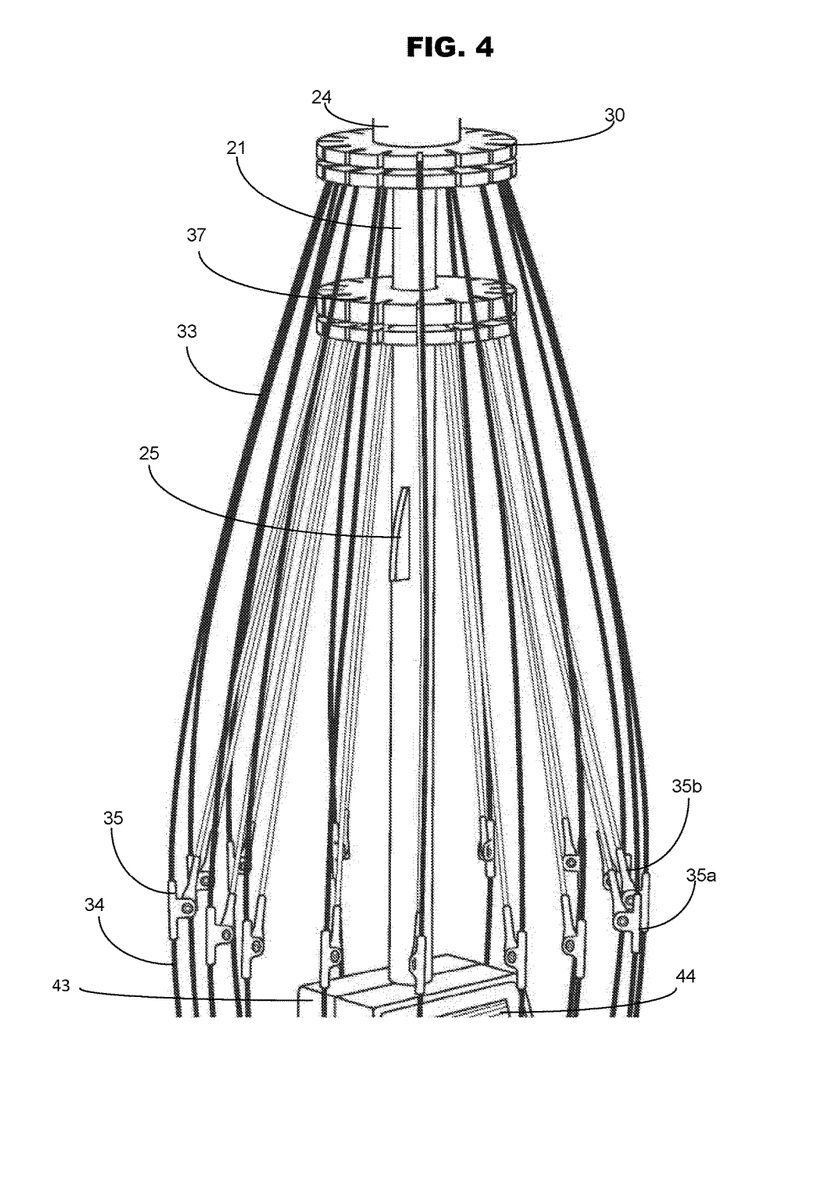
FIG. 4 is a partial side view of the solar-powered lantern of FIG. 1.

As illustrated in FIGS. 2 through 4, the first rib support 30 and the second rib support 31 respectively comprises a rib support base 30a, 31a, and a plurality of spaced apart rib support slots or notches 30b, 31b configured for placement around the periphery of the rib support base 30a, 31a. The runner 37 comprises a runner base 37a and a plurality of spaced apart slots/notches 37b configured for placement around the periphery of the runner base 37a. Such slots/notches 37b are to receive a corresponding stretcher 36.

Although the rib support bases 30a, 31a and the runner base 37a are illustrated having a generally circular cross-section, embodiments are not limited thereto, and thus, may encompass other cross-sections which fall within the spirit and scope of the principles of this disclosure.

A plurality of ribs 32, each rib 32 including a first rib section 33 configured for attachment between the first rib support 30 and a hinged bracket 35, and a second rib section 34 configured for attachment between the second rib support 31 and the hinged bracket 35. A plurality of stretchers 36, each stretcher 36 being configured for attachment at a first end thereof to the ribs 32 via the hinged bracket 35, and at second end thereof to a runner 37 which is arranged for selective movement along the longitudinal axis of the shaft 21. Alternatively, the first rib section 33 and the second rib section 34 may be formed as a single, continguous structure, in which the hinged bracket 35 is to facilitate expand/contrast the ribs 32 in a collapsed and expanded state.

Figure 6:
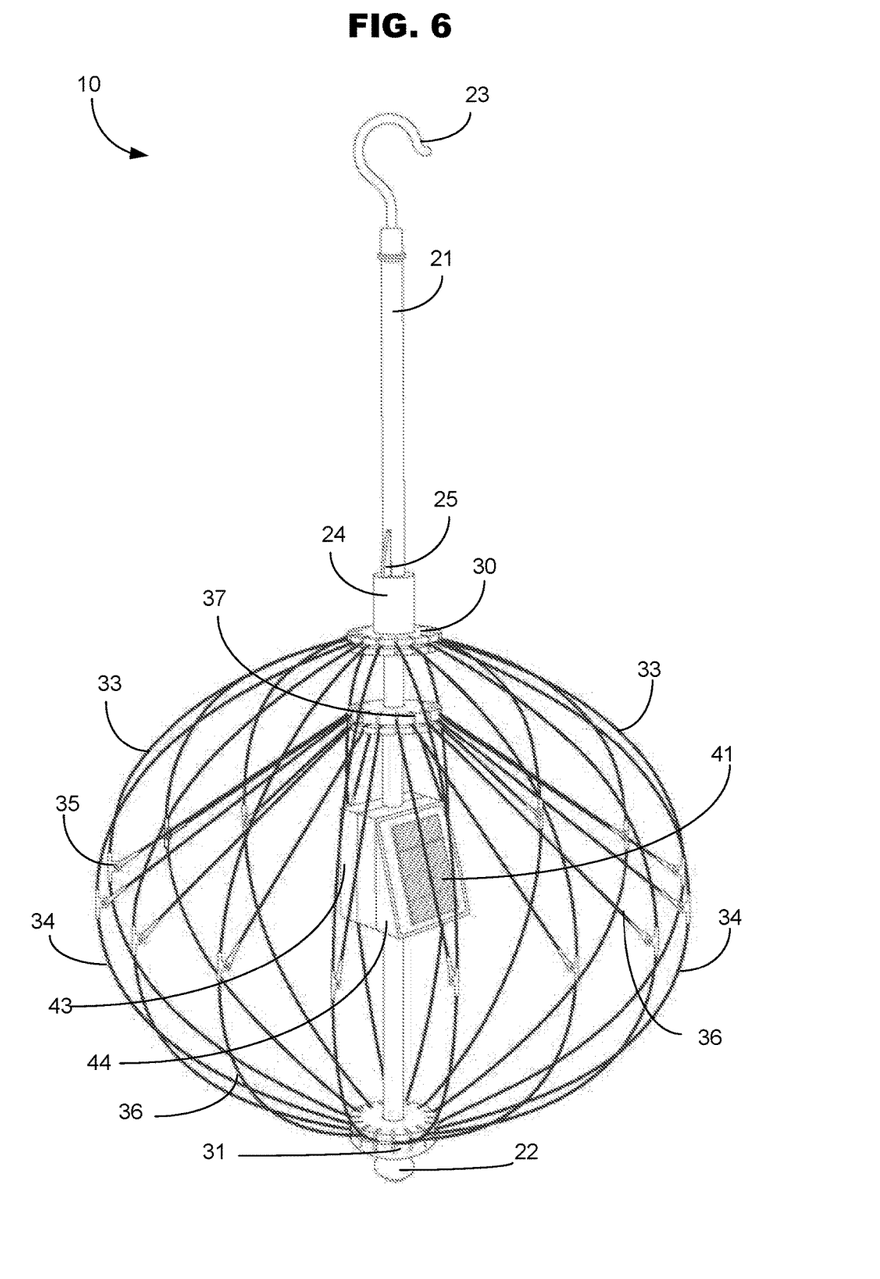
FIG. 6 is a side view of the solar-powered lantern of FIG. 1, in an expanded, deployed position.

As illustrated in FIGS. 4 and 6, the hinged bracket 35 comprises a hinged bracket base 35a and a hinged bracket arm 35b pivotally connected to the hinged bracket 35a for rotation with respect thereto. Accordingly, each first rib section 33 is configured for attachment between the first rib support 30 and one end of the hinged bracket base 35a, each second rib section 34 is configured for attachment between the second rib support 31 and the other end of the hinged bracket base 35a, and each stretcher 36 is configured for attachment between the runner 37 and one end of the hinged bracket arm 35b.

In accordance with embodiments, each first rib section 33 is configured for attachment to the first rib support 30 at a corresponding one of the rib support slots 30b, while each second rib section 34 is configured for attachment to the second rib support 31 at a corresponding one of the rib support slots 31b.

In accordance with embodiments, to move the lantern 10 from the collapsed, storage position (FIG. 1), to the expanded, deployed position (FIG. 6), the first rib support 30 and the runner 37 may be selectively moved along the longitudinal axis of the shaft 21 (See, FIG. 5B) until the locking sleeve 24 is held in the locked position by the spring 25. To maintain the lantern 10 in the expanded, deployed position, the locking sleeve 24 may be held in a releasably locked position by a spring 25.

The locking sleeve 24, and/or the first rib support 30, and/or the runner 37 may be configured for movement (upwardly and downwardly) along the shaft 21 either manually and/or automatically. The downward movement of the runner 37 causes a force to act upon the stretchers 36, thereby resulting in a pivoting movement of the hinged bracket arm 35b, while the downward movement of the first rib support 30 causes a force to act upon the first rib section 33. Such forces result in creating the final desired shape or configuration of the lantern 10 once the locking sleeve 24 is held in the locked position by the spring 25.

Such automatic control may be conducted via an actuator controlled by a control unit 43, and/or remotely by a handheld control unit. Embodiments, however, are not limited thereto and may encompass other methods of control which fall within the spirit and scope of the principles of this disclosure.

As illustrated in FIG. 6, in the expanded, deployed position of the lantern 10, the ribs 32 and the stretchers 36 are configured to form a substantially oval configuration. Embodiments, however, are not limited thereto and thus, may encompass any configuration which falls within the spirit and scope of the principles of this disclosure.

Figure 7:
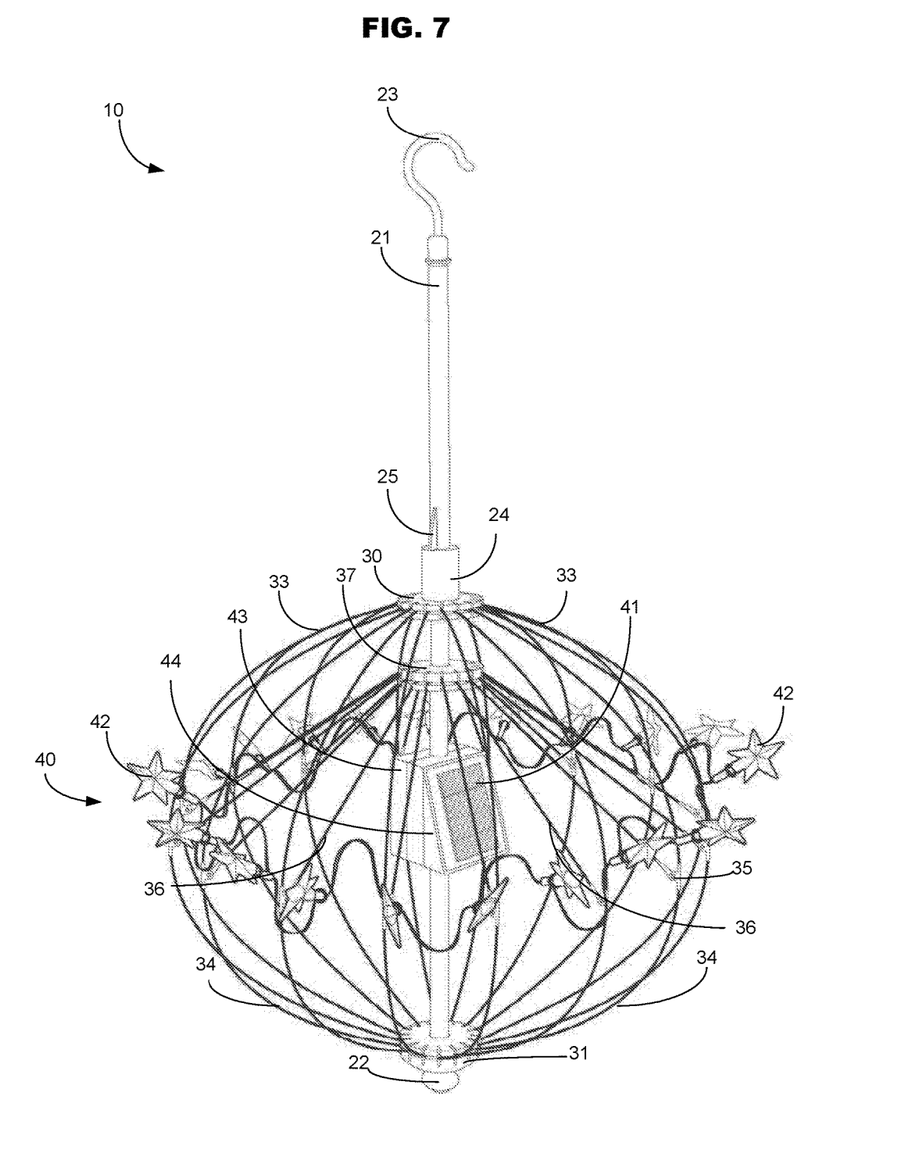
FIG. 7 is a side view of the solar-powered lantern of FIG. 6, with a string of light sources.

As illustrated in FIG. 7, in order to provide illumination, the lantern 10 further comprises a light assembly 40 that includes a power source, such as, for example, a solar power source including a solar module 44 having at least one solar panel 41, and a plurality of light sources 42 removably connected to the frame assembly 20 and configured for operative communication with the power source 41. A control unit 43 may be configured to control the light assembly 40. Embodiments, however, are not limited thereto and may encompass other light sources which fall within the spirit and scope of the principles of this disclosure. For example, alternatively, the light assembly 40 may be embodied to not require a solar power source 41 or a control unit 43. Such an embodiment may comprise one or more light source base(s) removably supported by the frame assembly 20. Each light source base may be configured to support a corresponding light source such as, for example, a candle for illumination.

Figure 8A:
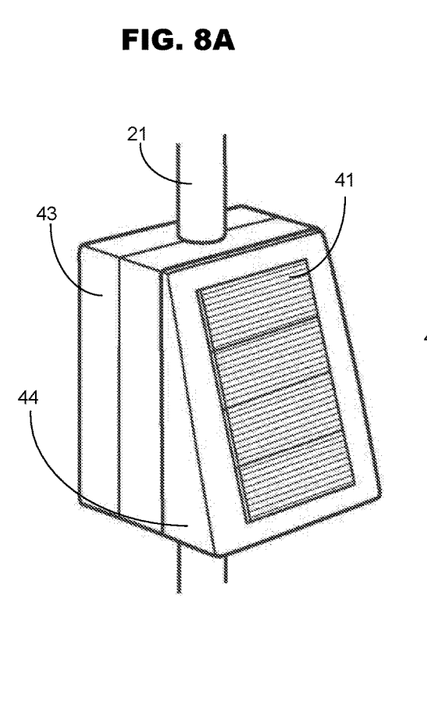
FIGS. 8A and 8B respectively illustrate a control housing and solar module of the light assembly of the solar-powered lantern, in accordance with embodiments.
Figure 8B:
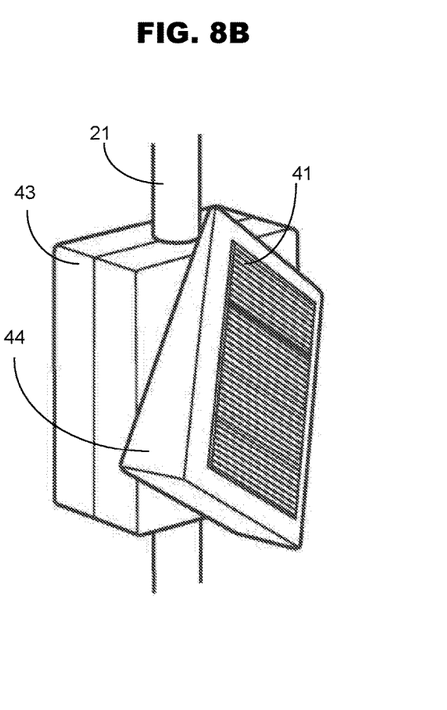
Figure 9:
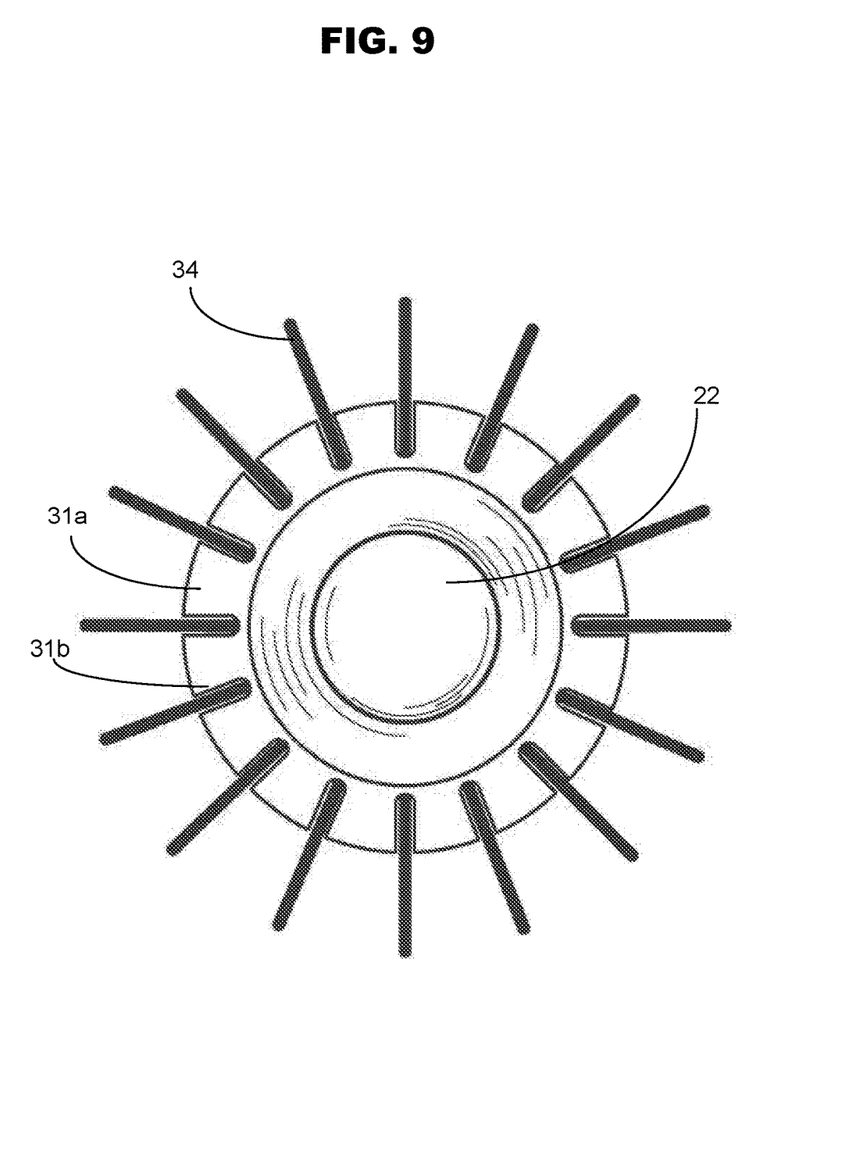
FIG. 9 is a top partial view of the solar-powered lantern, in accordance with embodiments.
Figure 10:
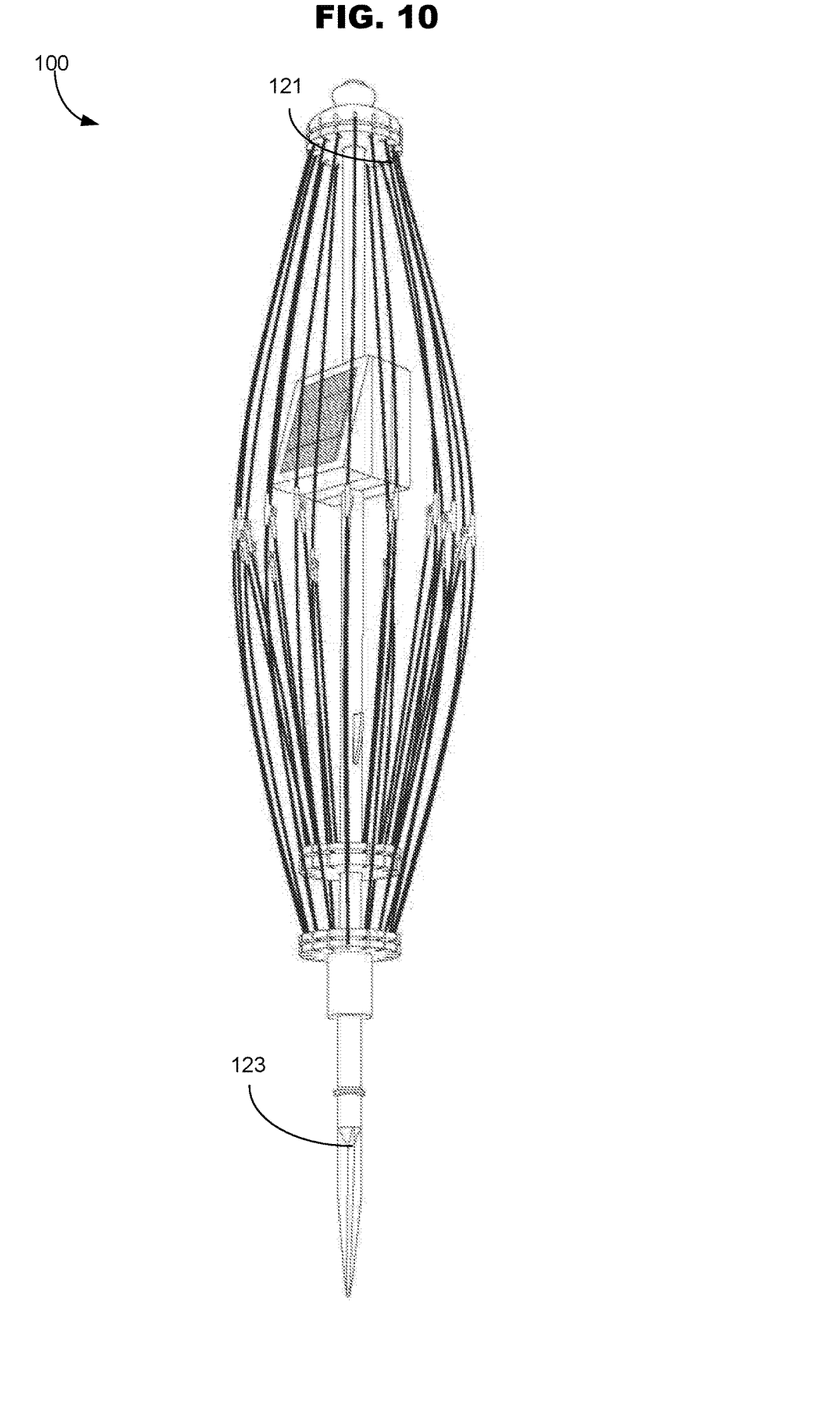
FIG. 10 is a side view of a solar-powered lantern in a collapsed, storage position, and having a removable spike for support thereof, in accordance with embodiments.

As illustrated in FIGS. 8A and 8B, the control unit 43 may include a control housing configured for placement on the shaft 21. In accordance with embodiments, the solar module 44 containing the solar panel(s) 41 may be attached to the control housing 41 for selective movement relative to the control housing 41. In this way, the solar panel(s) 41 may be adjustably orientated relative to the sun in to capture maximum exposure to sun light. Such selective movement of the solar module 44 may be done either manually and/or automatically. Such automatic control may be conducted via an actuator controlled by a control unit 43, and/or remotely by a handheld and portable control unit. Embodiments, however, are not limited thereto and may encompass other methods of control which fall within the spirit and scope of the principles of this disclosure.

The light assembly 40 may include an actuator, such as, for example, a power switch arranged on the shaft 21 or the control housing, to enable activation/deactivation of the light source(s) 42, i.e., initiate and/or halt the flow of electricity. A circuit board may be provided for electrical communication with the solar panel(s) 41 and the light source(s) 42 to regulate the voltage passing to and from the battery and the light source(s) 42. A rechargeable battery may also be provided and configured to be charged and discharged by the circuit board. The solar panel(s) 41 and the battery are configured to generate electricity for the light source(s) 42.

Alternatively, the control housing may include a photosensor to detect ambient light. The photosensor may be configured to trigger illumination of the light source(s) 42 when ambient light falls below a predetermined or threshold level. The photosensor may discontinue the illumination when ambient light levels are high or upon the expiration of an internal or programmed timer.

As illustrated in FIG. 7, in accordance with embodiments, the light source(s) 42 may comprise a string of light emitting diodes (LEDs) that are removably connected to the frame 20, and which are to emit light. For example, for example, light source(s) 42 may be removably connected by clipping to rib sections 32, 34. Embodiments, however, are not limited thereto and may encompass other light sources and connections that will fall within the spirit and scope of the principles of this disclosure.

Figure 11:
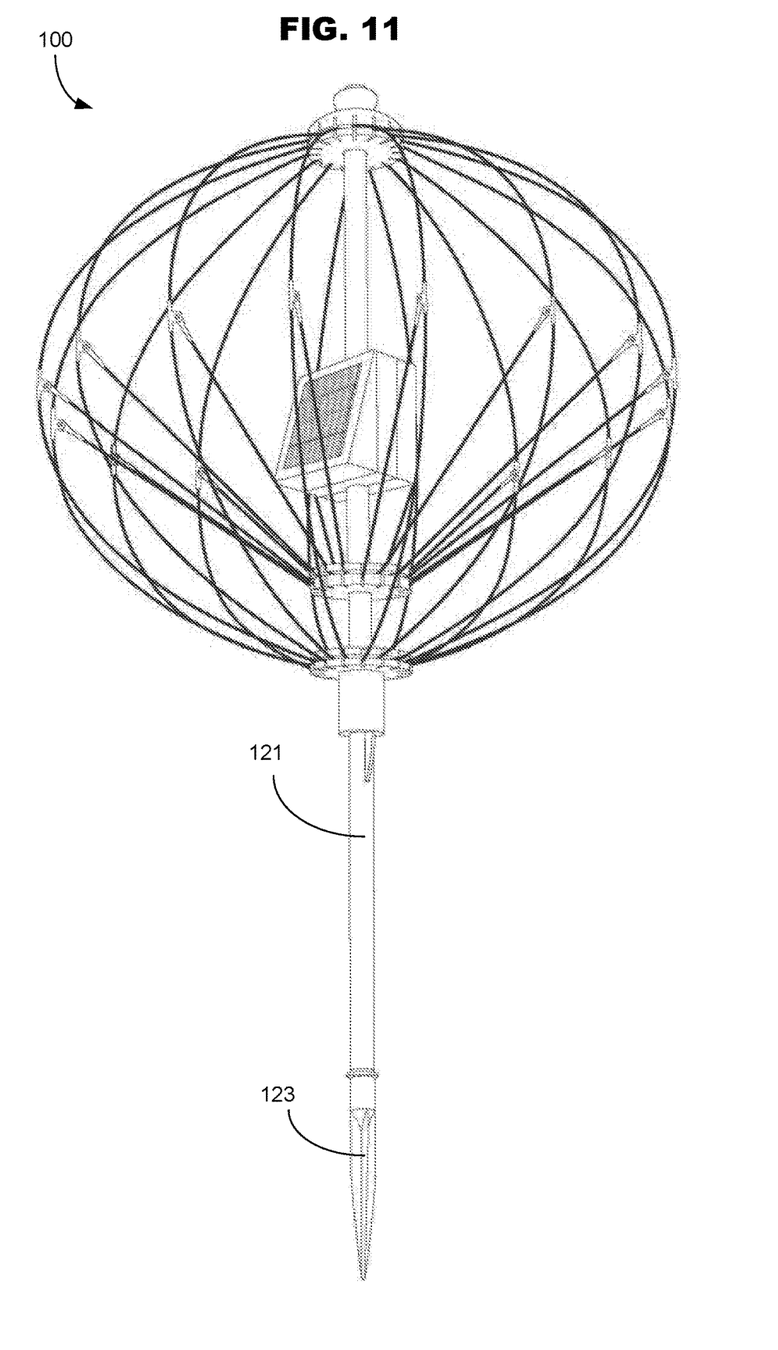
FIG. 11 is a side view of the solar-powered lantern of FIG. 10, in an expanded, deployed position.
Figure 12:
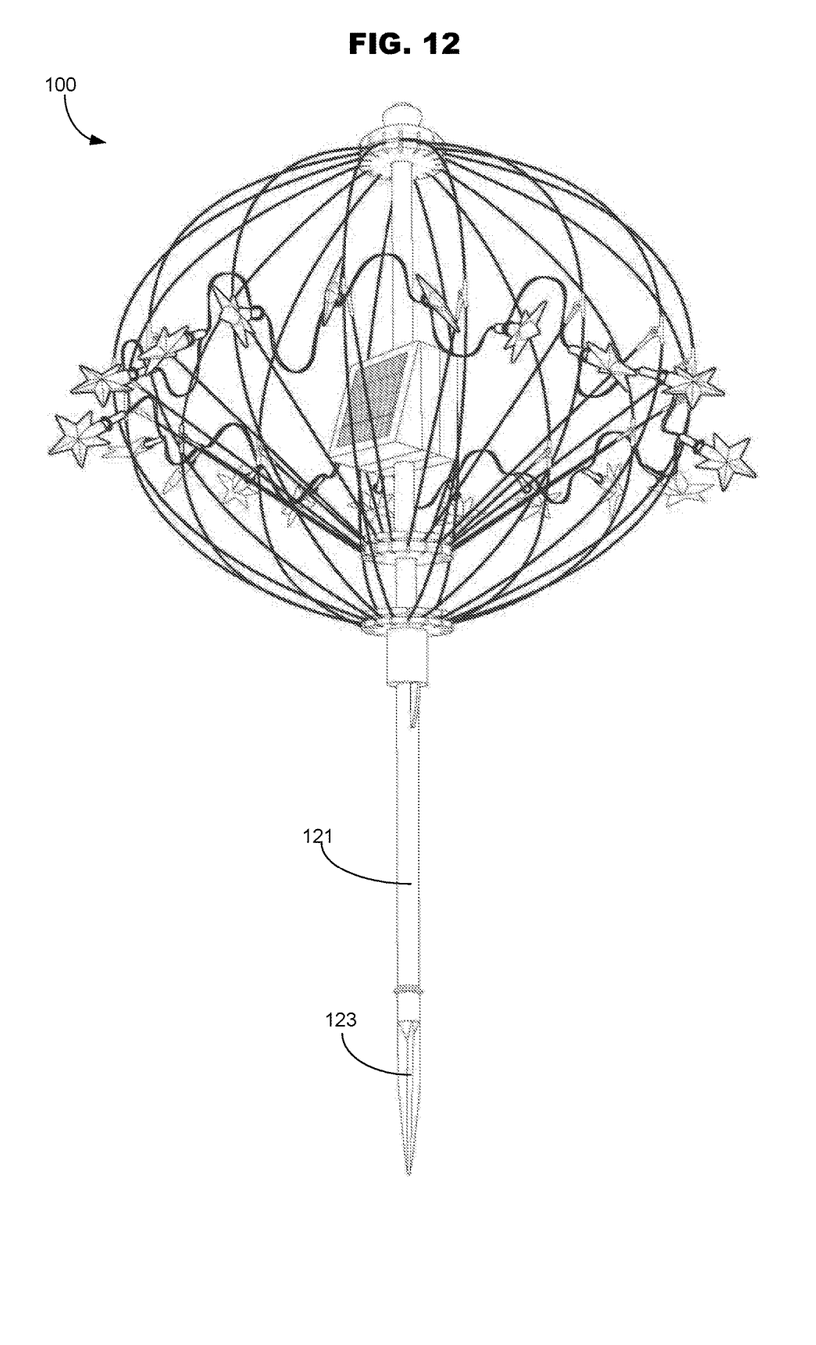
FIG. 12 is a side view of the solar-powered lantern of FIG. 10, with a string of light sources.

As illustrated in FIGS. 11 and 12, in an embodiment, a decorative solar-powered lantern 100 is in a collapsed, storage position (See, FIG. 11) and an expanded, deployed position (See, FIG. 12). By virtue of the fact this embodiment includes identical structural features, description of such features may be found herein with respect to the embodiment illustrated in FIGS. 1-10. In accordance with embodiments, the support device comprises a stake 123 which is removably attached to a second distal most end of the shaft 121, and which is insertable into a support surface to support or otherwise anchor the lantern 100 on the support surface.

ADDITIONAL NOTES AND EXAMPLES

Example One may include a lantern, comprising: a frame assembly including: a shaft having a longitudinal axis, a first rib support configured for placement on the shaft, a second rib support configured for placement on a distal end of the shaft, a plurality of ribs, each one of the ribs including a first rib section configured for attachment between the first rib support and a hinged bracket, and a second rib section configured for attachment between the second rib support and the hinged bracket, a plurality of stretchers, each one of the stretchers configured for attachment to the ribs via the hinged bracket, and a runner configured for attachment to the stretchers, wherein the first rib support and the runner are respectively configured for movement the along the longitudinal axis of the shaft to permit manipulation of the lantern between a collapsed, storage position and an expanded, deployed position; and a light assembly for illumination of the lantern.

Example Two may include the lantern of Example One, wherein the first rib support and the second rib support respectively comprises: a rib support base; and a plurality of spaced apart rib support slots/notches configured for placement around the periphery of the rib support base.

Example Three may include the lantern of Example Two, wherein: each first rib section is configured for attachment to the first rib support at a corresponding one of the rib support slots; and each second rib section is configured for attachment to the second rib support at a corresponding one of the rib support slots.

Example Four may include the lantern of Example One, wherein the runner comprises: a runner base; and a plurality of spaced apart slots/notches configured for placement around the periphery of the runner base and which are to receive a corresponding stretcher for attachment to the runner.

Example Five may include the lantern of Example One, wherein the light assembly comprises: a power source; and a plurality of light sources removeably connected to the frame assembly and configured for operative communication with the power source.

Example Six may include the lantern of Example One, further comprising a control unit configured to control the light assembly, the control unit including a control housing configured for placement on the shaft.

Example Seven may include the lantern of Example Six, wherein the power source comprises at least one solar panel configured for placement on the control housing.

Example Eight may include the lantern of Example Seven, wherein the at least one solar panel is configured for selective movement relative to the control housing to permit adjustable orientation of the at least one solar panel relative to the sun.

Example Nine may include the lantern of Example One, further comprising a suspension member configured for removable attachment to a first end of the shaft to permit suspension of the lantern from a suspension point.

Example Ten may include the lantern of Example One, further comprising a support member configured for removable attachment to a first end of the shaft to permit support of the lantern on a support surface.

Example Eleven may include solar-powered lantern, comprising: a frame assembly including: a shaft, a pair of spaced apart rib supports configured for placement on the shaft, including a first rib support moveably connected to the shaft, and a second rib fixedly supported to the shaft at a distal end, at least one rib configured for attachment between the rib supports, at least one stretcher configured for a hinged attachment to the ribs, and a runner configured for attachment to the at least one stretcher, wherein the first rib support and the runner are respectively configured for movement (sliding) the along the longitudinal axis of the shaft to permit manipulation of the lantern between a collapsed, storage position and an expanded, deployed position; and a light assembly including a power source and a plurality of light sources in operative communication with the power source for illumination of the lantern, wherein the power source includes at least one solar panel configured for selective movement to permit adjustable orientation of the at least one solar panel relative to the sun.

Example Twelve may include the solar-powered lantern of Example Eleven, wherein the first rib support and the second rib support respectively comprises: a rib support base; and a plurality of spaced apart rib support slots/notches configured for placement around the periphery of the rib support base.

Example Thirteen may include the solar-powered lantern of Example Eleven, wherein: each first rib section is configured for attachment to the first rib support at a corresponding one of the rib support slots; and each second rib section is configured for attachment to the second rib support at a corresponding one of the rib support slots.

Example Fourteen may include the solar-powered lantern of Example Eleven, wherein the runner comprises: a runner base; and a plurality of spaced apart slots/notches configured for placement around the periphery of the runner base and which are to receive a corresponding stretcher for attachment to the runner.

Example Fifteen may include the solar-powered lantern of Example Eleven, further comprising a control unit configured to control the light assembly, the control unit including a control housing configured for placement on the shaft.

Example Sixteen may include the solar-powered lantern of Example Fifteen, wherein the at least one solar panel is configured for placement on the control housing for selective movement relative to the control housing.

Example Seventeen may include the solar-powered lantern of Example Eleven, further comprising a suspension member configured for removable attachment to a first end of the shaft to permit suspension of the lantern from a suspension point.

Example Eighteen may include the solar-powered lantern of Example Eleven, further comprising a support member configured for removable attachment to a first end of the shaft to permit support of the lantern on a support surface.

Example Nineteen may include a lantern, comprising: a frame assembly including: a shaft, a pair of spaced apart rib supports configured for placement on the shaft, including a first rib support moveably connected to the shaft, and a second rib fixedly supported to the shaft, at least one rib configured for attachment between the rib supports, at least one stretcher configured for a hinged attachment to the ribs; and a runner configured for attachment to the at least one stretcher, wherein the first rib support and the runner are respectively configured for movement (sliding) the along the longitudinal axis of the shaft to permit manipulation of the lantern between a collapsed, storage position and an expanded, deployed position; and a light assembly for illumination of the lantern.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

REFERENCE NUMERALS

10, 100 Lantern
20 Frame assembly 21, 121 Shaft
22 Ferrule
23, 123 Support device
24 Locking sleeve
25 Spring
30 1st rib support
30a 1st rib support base
30b 1st rib support slots/notches
31 2nd rib support
31a 2nd rib support base
31b 2nd rib support slots/notches
32 Ribs
33 1st rib section
34 2nd rib section
35 Hinged bracket
35a Hinged bracket base
35b Hinged bracket arm
36 Stretcher
37 Runner
37a Runner base
37b Runner slots/notches
40 Light assembly
41 Solar panel(s)
42 Light source(s)
43 Control unit
44 Solar module

What is claimed is:

1. A lantern, comprising:
a frame assembly including:
    a shaft having a longitudinal axis;
    a first rib support configured for placement on the shaft, the first rib support including a first rib support base and a plurality of spaced apart first rib support slots/notches configured for placement around the periphery of the first rib support base;
    a second rib support configured for placement on a distal end of the shaft, the second rib support including a second rib support base and a plurality of spaced apart second rib support slots/notches configured for placement around the periphery of the second rib support base;
    a plurality of ribs, each one of the ribs including a first rib section configured for attachment between the first rib support and a hinged bracket, and a second rib section configured for attachment between the second rib support and the hinged bracket, wherein each first rib section is configured for attachment to the first rib support at a corresponding one of the rib support slots and each second rib section is configured for attachment to the second rib support at a corresponding one of the rib support slots;
    a plurality of stretchers, each one of the stretchers configured for attachment to the first rib support and a corresponding one of the ribs via the hinged bracket; and
    a runner configured for attachment to the stretchers, wherein the first rib support and the runner are respectively configured for movement along the longitudinal axis of the shaft to permit manipulation of the lantern between a collapsed, storage position and an expanded, deployed position;
a light assembly for illumination of the lantern.

2. The lantern of claim 1, wherein the runner comprises:
a runner base; and
a plurality of spaced apart slots/notches configured for placement around the periphery of the runner base and which are to receive a corresponding stretcher for attachment to the runner.

3. The lantern of claim 1, wherein the light assembly comprises:
a power source; and
a plurality of light sources removably connected to the frame assembly and configured for operative communication with the power source.

4. The lantern of claim 1, further comprising a control unit configured to control the light assembly, the control unit including a control housing configured for placement on the shaft.

5. The lantern of claim 4, wherein the power source comprises at least one solar panel configured for placement on the control housing.

6. The lantern of claim 5, wherein the at least one solar panel is configured for selective movement relative to the control housing to permit adjustable orientation of the at least one solar panel relative to the sun.

7. The lantern of claim 1, further comprising a suspension member configured for removable attachment to a first end of the shaft to permit suspension of the lantern from a suspension point.

8. The lantern of claim 1, further comprising a support member configured for removable attachment to a first end of the shaft to permit support of the lantern on a support surface.

9. A solar-powered lantern, comprising:
a frame assembly including:
    a shaft;
    a pair of spaced apart rib supports configured for placement on the shaft, including a first rib support moveably connected to the shaft, and a second rib fixedly supported to the shaft at a distal end, wherein the first rib support and the second rib support respectively include a rib support base and a plurality of spaced apart rib support slots/notches configured for placement around the periphery of the rib support base;
    at least one rib configured for attachment between the rib supports, the at least one rib including a first rib section configured for attachment to the first rib support at a corresponding one of the rib support slots/notches, and a second rib section configured for attachment to the second rib support at a corresponding one of the rib support slots/notches;
    at least one stretcher configured for a hinged attachment to the ribs first rib support and a corresponding at least one rib; and
    a runner configured for attachment to the at least one stretcher, wherein the first rib support and the runner are respectively configured for movement along the longitudinal axis of the shaft to permit manipulation of the lantern between a collapsed, storage position and an expanded, deployed position; and
a light assembly including a power source and a plurality of light sources in operative communication with the power source for illumination of the lantern, wherein the power source includes at least one solar panel configured for selective movement to permit adjustable orientation of the at least one solar panel relative to the sun.

10. The solar-powered lantern of claim 9, wherein the runner comprises:
a runner base; and a plurality of spaced apart slots/notches configured for placement around the periphery of the runner base and which are to receive a corresponding stretcher for attachment to the runner.

11. The solar-powered lantern of claim 9, further comprising a control unit configured to control the light assembly, the control unit including a control housing configured for placement on the shaft.

12. The solar-powered lantern of claim 11, wherein the at least one solar panel is configured for placement on the control housing for selective movement relative to the control housing.

13. The solar-powered lantern of claim 9, further comprising a suspension member configured for removable attachment to a first end of the shaft to permit suspension of the lantern from a suspension point.

14. The solar-powered light device of claim 9, further comprising a support member configured for removable attachment to a first end of the shaft to permit support of the lantern on a support surface.

15. A lantern, comprising:
a frame assembly including:
  a shaft;
  a pair of spaced apart rib supports configured for placement on the shaft, including a first rib support moveably connected to the shaft, and a second rib fixedly supported to the shaft, wherein the first rib support and the second rib support respectively include a rib support base and a plurality of spaced apart rib support slots/notches configured for placement around the periphery of the rib support base;
  at least one rib configured for attachment between the rib supports, the at least one rib including a first rib section configured for attachment to the first rib support at a corresponding one of the rib support slots/notches, and a second rib section configured for attachment to the second rib support at a corresponding one of the rib support slots/notches;
  at least one stretcher configured for a hinged attachment to the first rib support and a corresponding at least one rib; and
  a runner configured for attachment to the at least one stretcher, wherein the first rib support and the runner are respectively configured for movement along the longitudinal axis of the shaft to permit manipulation of the lantern between a collapsed, storage position and an expanded, deployed position; and
a light assembly for illumination of the lantern.

16. The lantern of claim 15, wherein the runner comprises:
a runner base; and
a plurality of spaced apart slots/notches configured for placement around the periphery of the runner base and which are to receive a corresponding stretcher for attachment to the runner.

17. The lantern of claim 15, further comprising a control unit configured to control the light assembly, the control unit including a control housing configured for placement on the shaft.

18. The lantern of claim 15, further comprising a suspension member configured for removable attachment to a first end of the shaft to permit suspension of the lantern from a suspension point.

19. The light device of claim 9, further comprising a support member configured for removable attachment to a first end of the shaft to permit support of the lantern on a support surface.

* * * * *